US008837643B2

United States Patent
Kishimoto et al.

(10) Patent No.: US 8,837,643 B2
(45) Date of Patent: Sep. 16, 2014

(54) RECEIVING APPARATUS

(75) Inventors: Naomichi Kishimoto, Kanagawa (JP);
Katsumi Takaoka, Chiba (JP);
Kazukuni Takanohashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/459,614

(22) Filed: Apr. 30, 2012

(65) Prior Publication Data

US 2012/0300881 A1    Nov. 29, 2012

(30) Foreign Application Priority Data

May 23, 2011   (JP) ................................. 2011-115122

(51) Int. Cl.
*H03D 1/00* (2006.01)
*H04L 27/06* (2006.01)
*H04L 27/00* (2006.01)
*H04L 7/08* (2006.01)

(52) U.S. Cl.
CPC ..... *H04L 27/0014* (2013.01); *H04L 2027/0053* (2013.01); *H04L 2027/0065* (2013.01); *H04L 7/08* (2013.01); *H04L 2027/0083* (2013.01)
USPC ....................................................... 375/343

(58) Field of Classification Search
USPC .......................................... 375/343; 370/320
See application file for complete search history.

(56) References Cited

U.S. PATENT DOCUMENTS

2004/0042534 A1*  3/2004  Raphaeli et al. ............... 375/150
2011/0293040 A1*  12/2011  Dupont et al. ................ 375/316

OTHER PUBLICATIONS

Dazhi He, et al., "Error Rotated Decision Feedback Equalizer for Chinese DTTB Receiver", National Science Foundation of China, Science and Technology Commission of Shanghai Municipality, Mar. 31-Apr. 2, 2008, 5 pages.
Zi-Wei Zheng, et al., "Novel Synchronization for TDS-OFDM-Based Digital Television Terrestrial Broadcast Systems", IEEE Transactions on Broadcasting, vol. 50, No. 2, Jun. 2004, pp. 148-153.
Ming Liu, et al., "A Combined Time and Frequency Algorithm for Improved Channel Estimation in TDS-OFDM", IEEE Communications Society, 2010, 6 pages.

* cited by examiner

*Primary Examiner* — Tanmay Shah
(74) *Attorney, Agent, or Firm* — Oblon, Spivak, McClelland, Maier & Neustadt, L.L.P.

(57) ABSTRACT

A receiving apparatus includes a correlation operation unit and a determination unit. The correlation operation unit is configured to perform a correlation operation with a known signal on a received signal including the known signal in a predetermined interval. The determination unit is configured to determine whether or not a correlation peak interval detected by the correlation operation unit deviates from the predetermined interval.

9 Claims, 13 Drawing Sheets

RECEIVING APPARATUS

BACKGROUND

The present technology relates to a receiving apparatus which is configured to allow stable synchronization control, in particular, even in a multipath environment.

In the digital terrestrial multimedia broadcast (DTMB) standard (GB20600-2006), a predetermined pseudo-random noise (PN) sequence is added to a transmission frame.

FIG. 1 is a diagram illustrating a frame structure defined by the DTMB standard.

The DTMB frame structure is composed of four layers: Calendar Day Frame 10, Minute Frame 11, Super Frame 12, and Signal Frame 13, listed in the order from highest hierarchical level.

The lowest-level layer, Signal Frame 13, is composed of Frame Body 15 and Frame Header 14.

Frame Body 15 is made up of 3780 symbols in total, in which 36 symbols System information such as modulation type information, coded rate information, etc., and 3744 symbols data. The symbol rate for Frame Body 15 is defined as 7.56 Msps, and therefore the time duration of Frame Body 15 is 500 µs.

Frame Header 14 is a predetermined PN sequence of 420 symbols long (about 55.6 µs), 595 symbols long (about 78.7 µs), or 945 symbols long (about 125 µs).

Super Frame 12 is made up of as many Signal Frames 13 as necessary for the total time duration of the Signal Frames to be 125 ms.

Minute Frame 11 is made up of 480 Super Frames 12, and has a time duration of 1 minute.

Calendar Day Frame 10 is made up of 1440 Minute Frames 11, and has a time duration of 24 hours.

In this specification, hereinafter the term "frame" is used in referring to "Single Frame 13".

It is known that a DTMB compliant receiver controls various synchronizations such as carrier synchronization and symbol timing synchronization, by generating correlation values with a PN sequence, which correlation values are a result of a convolution operation between received data and a PN sequence generated by the receiver, and using a correlation value of a predetermined position based on a position at which a correlation value power takes a peak value during a single frame length.

FIG. 2 is a diagram illustrating a structure of a PN correlation operation unit 20 which receives a DTMB signal, calculates a correlation value with a PN sequence, and outputs a correlation value of a predetermined position based on a power peak position.

Input data D(n) received by the PN correlation operation unit 20 is input to a convolution operation unit 21. The convolution operation unit 21 performs a convolution operation between the input signal D(n) and PN(k) which is the entire or a part of a PN sequence defined by the DTMB standard. Assuming that the length of the PN sequence used for calculation of a correlation value is L symbols long, a correlation value Corr(n), which is an output signal from the convolution operation unit 21, is represented by Equation (1) as follows:

$$Corr(n) = \sum_{k=1}^{L-1} PN(k) \cdot D(n-k) \qquad (1)$$

The convolution operation unit 21 outputs the Corr(n), which is a result of the convolution operation, to both a power calculation unit 22 and a correlation value output unit 28.

The power calculation unit 22 calculates a power Pow(n) from the Corr(n) that is an input signal from the convolution operation unit 21, and outputs the Pow(n) to a peak position search unit 23. The Pow(n) is represented by Equation (2) as follows:

$$Pow(n) = |Corr(n)|^2 \qquad (2)$$

The peak position search unit 23 outputs m, which indicates a current symbol position, to the correlation value output unit 28. Furthermore, the peak position search unit 23 outputs a peak position Pos_max, at which the Pow(n) that is an input signal from the power calculation unit 22 is at a maximum during a single frame length, to the correlation value output unit 28, where the symbol position m takes on values from 0 to FLEN−1, and FLEN indicates a frame length.

The peak position search unit 23 is made up of a control unit 24, a symbol counter 25, a power holding unit 26, and a symbol position holding unit 27.

When receiving the Pow(n) obtained by the power calculation unit 22, the control unit 24 instructs the symbol counter 25 to increment the symbol position m. Subsequently, the control unit 24 compares the Pow(n) thus received with a power Pow_larger held by the power holding unit 26. If the Pow(n) is greater, the control unit 24 instructs the power holding unit 26 to replace the Pow_larger with the Pow(n), and further instructs the symbol position holding unit 27 to replace a symbol position Pos_larger, which is currently held by the symbol position holding unit 27, with the symbol position m. In this way, the control unit 24 updates the symbol position Pos_larger to that associated with larger power.

Every time the control unit 24 applies the aforementioned process to input data during a single-frame length which ranges from m=0 to m=FLEN−1, the control unit 24 outputs Pos-max as Pos_larger.

The symbol counter 25 holds a symbol position m which is instructed by the control unit 24 to be incremented or to be initialized to 0 (zero). The symbol counter 25 outputs the symbol position m held thereby to the correlation value output unit 28.

The power holding unit 26 holds a power Pow_larger. In response to an instruction from the control unit 24, the power holding unit 26 performs replacement of a power to be held so as to be Pow_larger=Pow(n).

The symbol position holding unit 27 holds a symbol position Pos_larger. In response to an instruction from the control unit 24, the symbol position holding unit 27 performs replacement of a symbol position to be held so as to be Pos_larger=m, or performs initialization of a symbol position to be held so as to be Pos_larger=0.

FIG. 3 is a flowchart explaining how the peak position search unit 23 operates.

In step S11, the control unit 24 determines whether or not a new Pow(n) is input from the power calculation unit 22.

If it is determined in step S11 that a new Pow(n) is not input, the control unit 24 waits until a new Pow(n) is input.

On the other hand, if it is determined in step S11 that a new Pow(n) is input, the control unit 24 instructs the symbol counter 25 to initialize the symbol position m to 0 (zero) in step S12.

In step S13, the control unit 24 instructs the symbol position holding unit 27 to initialize the symbol position Pos_larger to 0 (zero).

In step S14, the control unit 24 instructs the power holding unit 26 to initialize the power Pow_larger to Pow(n).

In step S15, the control unit 24 determines whether or not a new Pow(n) is input.

If it is determined in step S15 that a new Pow(n) is not input, the control unit 24 waits until a new Pow(n) is input.

On the other hand, if it is determined in step S15 that a new Pow(n) is input, the control unit 24 instructs the symbol counter 25 in step S16 to increment the symbol position m by one.

In step S17, the control unit 24 determines whether or not the Pow(n) is greater than the Pow_larger which is currently held by the power holding unit 26.

If it is determined in step S17 that the Pow(n) is not greater than the Pow_larger, the process branches to step S20.

On the other hand, if it is determined in step S17 that the Pow(n) is greater than the pow_larger, the control unit 24 instructs the symbol position holding unit 27 to replace the symbol position pos_larger with m in step S18.

In step S19, the control unit 24 instructs the power holding unit 26 to replace the power Pow_larger with the Pow(n), and branches the process to step S20.

In step S20, the control unit 24 determines whether or not the symbol position m in the symbol counter 25 is FLEN−1.

If it is determined in step S20 that the symbol position m in the symbol counter 25 is not FLEN−1, the control unit 24 returns the process to step S15, and repeats the processing steps from step S15 to step S20 until the symbol position m is determined to be FLEN−1.

On the other hand, if it is determined in step S20 that the symbol position m in the symbol counter 25 is FLEN−1, the control unit 24 performs update to the output value Pos_max as a symbol position Pos_larger in step S21.

Through the processing steps described above, a peak position Pos-max, at which the input power is at a maximum during a single-frame length, is determined. After step S21 is processed, the process returns to step S11, and a process of searching for a peak position is performed on the input power during a next frame length.

The correlation value output unit 28 illustrated in FIG. 2 outputs a correlation value Corr_p of a predetermined position d based on a peak position that a subsequent synchronization circuit requests, based on Corr(n) that is an input signal from the convolution operation unit 21, a symbol position m and a peak position Pos_max that are input signals from the peak position search unit 23.

The correlation value output unit 28 contains a control unit 29 and a correlation value buffer 30.

The correlation value buffer 30 is a buffer for one frame length Corr_buf(k) (0≤k≤FLEN−1). Writing data to the correlation value buffer 30 and reading data from the correlation value buffer 30 are performed according to an instruction from the control unit 29.

When receiving Corr(n) which is an input signal from the convolution operation unit 21, the control unit 29 writes Corr_buf(m)=Corr(n) to the correlation value buffer 30 using the symbol m as an address.

Furthermore, when receiving Pos_max from the peak position search unit 23, the control unit 29 reads a correlation value of a predetermined position d based on the peak position Pos_max from the correlation value buffer 30 as described in Equation (3) given below, and outputs the correlation value to a subsequent circuit.

$$Corr\_p = Corr\_buf((Pos\_max + d) \% \ FLEN) \quad (3)$$

FIG. 4 is a flowchart explaining how the correlation value output unit 28 operates.

In step S31, the control unit 29 determines whether or not a new Corr(n) is input from the convolution operation unit 21.

If it is determined in step S31 that a new Corr (n) is not input, the control unit 29 waits until a new Corr(n) is input.

On the other hand, if it is determined in step S31 that a new Corr(n) is input, then the control unit 29 determines whether or not a new Pos_max is input from the peak position search unit 23 in step S32.

If it is determined in step S32 that a new Pos_max is not input, the control unit 29 branches the process to step S34.

On the other hand, if it is determined in step S32 that a new Pos_max is input, the control unit 29 reads a correlation value, which a subsequent circuit requests, of a predetermined position d based on the Pos_max from the correlation value buffer 30 in step S32, then outputs the correlation value to a subsequent circuits, and branches the process to step S34.

In step S34, the control unit 29 writes the correlation value Corr(n) to the Corr_buf(m) that is an address m of the correlation value buffer 30. After step S34, the process returns to step S31, and the processing steps above are repeated.

Through the processing steps above, it is possible, based on the symbol position m and the peak position Pos_max, to output a correlation value of a position that is shifted by d symbols from the predetermined position based on a peak position Pos_max that a subsequent synchronization circuit requests.

FIG. 5 is a timing chart explaining how the PN correlation operation unit 20 operates in a single wave environment with no multipath.

As an output example for a peak position Pos_max, there is shown a correlation value Corr_p of the peak position Pos_max. In a single wave environment, a power Pow (n) usually takes its maximum at a symbol position Path1 in which a path exists, and the same correlation value Corr_buf (Path1) is output constantly as a correlation value Corr_p (see, for example, Dazhi He, Weiqiang Liang, Wenjun Zhang, Ge Huang, Yunfeng Guan, Feng Ju, "Error rotated decision feedback equalizer for Chinese DTTB Receiver", Broadband Multimedia Systems and Broadcasting, 2008 IEEE International Symposium on; Liu, M., Crussiere, M., Helard, J.-F., "A Combined Time and Frequency Algorithm for Improved Channel Estimation in TDS-OFDM", Communications (ICC), 2010 IEEE International Conference on; and Zi-Wei Zheng, Zhi-Xing Yang, Chang-Yong Pan, and Yi-Sheng Zhu, Senior Member, IEEE, "Novel Synchronization for TDS-OFDM-Based Digital Television Terrestrial Broadcast Systems", IEEE TRANSACTIONS ON BROADCASTING, VOL. 50, NO. 2, JUNE 2004).

SUMMARY

In a multipath environment in which a reflected wave exists, power of each path may fluctuate due to channel time-variation, etc. As a result, a path position at which the power Pow(n) may take its maximum value varies for each frame. Furthermore, an output from the PN correlation operation unit 20, i.e., a correlation value of a predetermined position based on a peak position, may differ for each frame.

When different path correlation values are output from the PN correlation operation unit 20, stable synchronization control is disabled. This is because a subsequent synchronization circuit operates to bring synchronization with a path which differs for each frame.

In view of the foregoing, there is a need for providing stable synchronization control even in a multipath environment.

According to one embodiment of the present technology, a receiving apparatus includes: a correlation operation unit configured to perform a correlation operation with a known signal on a received signal including the known signal in a predetermined interval; and a determination unit configured to determine whether or not a correlation peak interval detected by the correlation operation unit deviates from the predetermined interval.

The received signal may be a signal defined by the GB20600-2600 standard, and the known signal may be a pseudo noise signal defined by the GB20600-2006 standard.

The receiving apparatus above may further include a frequency error detection unit configured to detect a frequency error based on a phase difference between each two successive correlation peaks detected by the correlation operation unit.

The receiving apparatus may further include a frequency error correction unit configured to perform correction on the frequency error when the determination unit determines that a correlation peak interval detected by the correlation operation unit deviates from the predetermined interval.

The receiving apparatus may further include a timing error detection unit configured to detect a timing error based on a correlation peak position detected by the correlation operation unit.

The receiving apparatus may further include a timing error correction unit configured to perform correction on the timing error when the determination unit determines that a correlation peak interval detected by the correlation operation unit deviates from the predetermined interval.

According to one embodiment of the present technology, a correlation operation with a known signal is performed on a received signal which contains the known signal in a predetermined interval, and it is determined whether or not a correlation peak interval deviates from the predetermined interval.

According to the present technology, stable synchronization control is provided even in a multipath environment.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments to implement the present technology will be described.

First Embodiment

Figure 6:
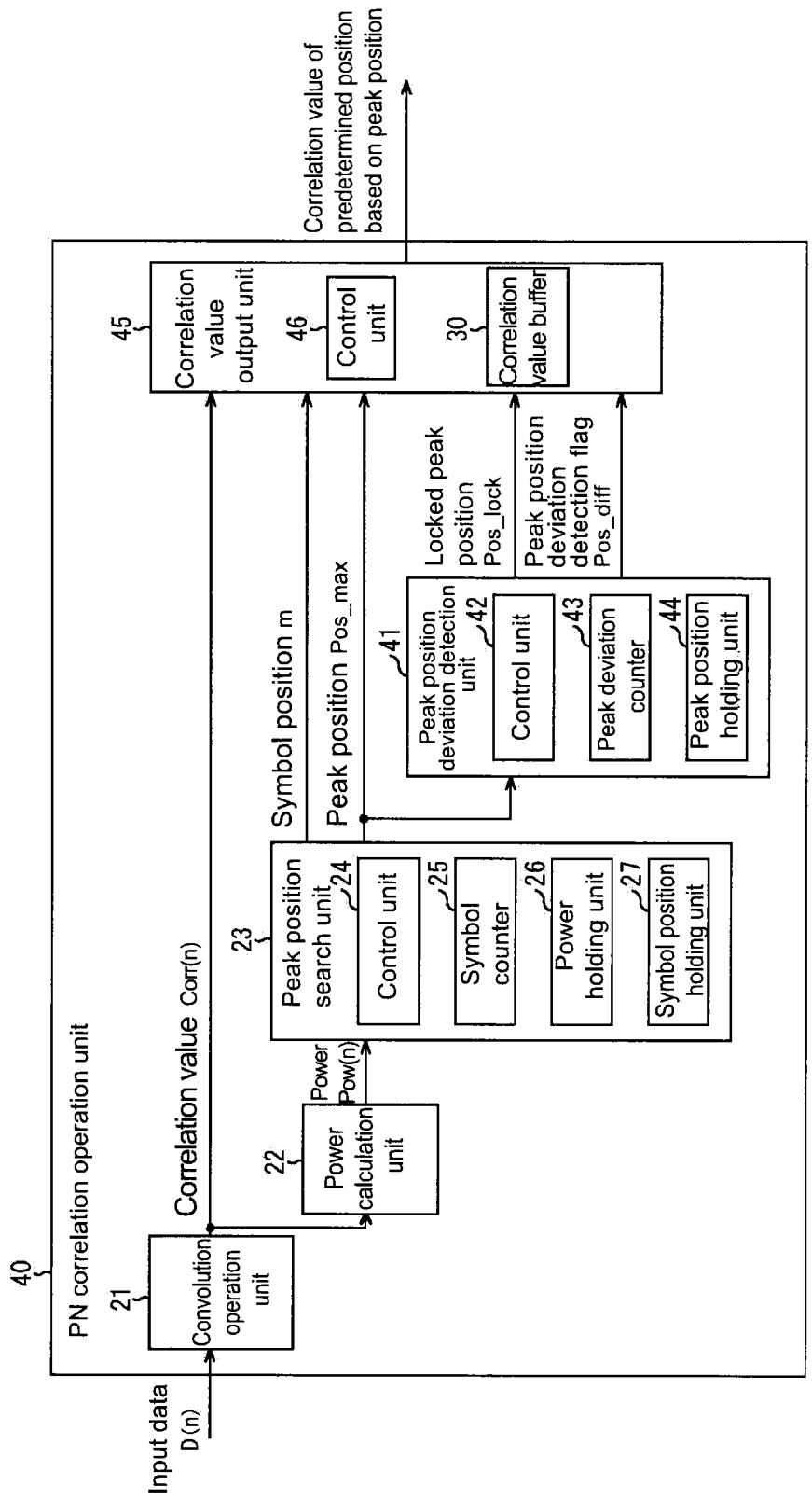
FIG. 6 is a block diagram illustrating an exemplary configuration of a first embodiment of a receiving apparatus to which the present technology is applied.

FIG. 6 is a block diagram illustrating an exemplary configuration of a first embodiment of a receiving apparatus to which the present technology is applied.

Figure 1:
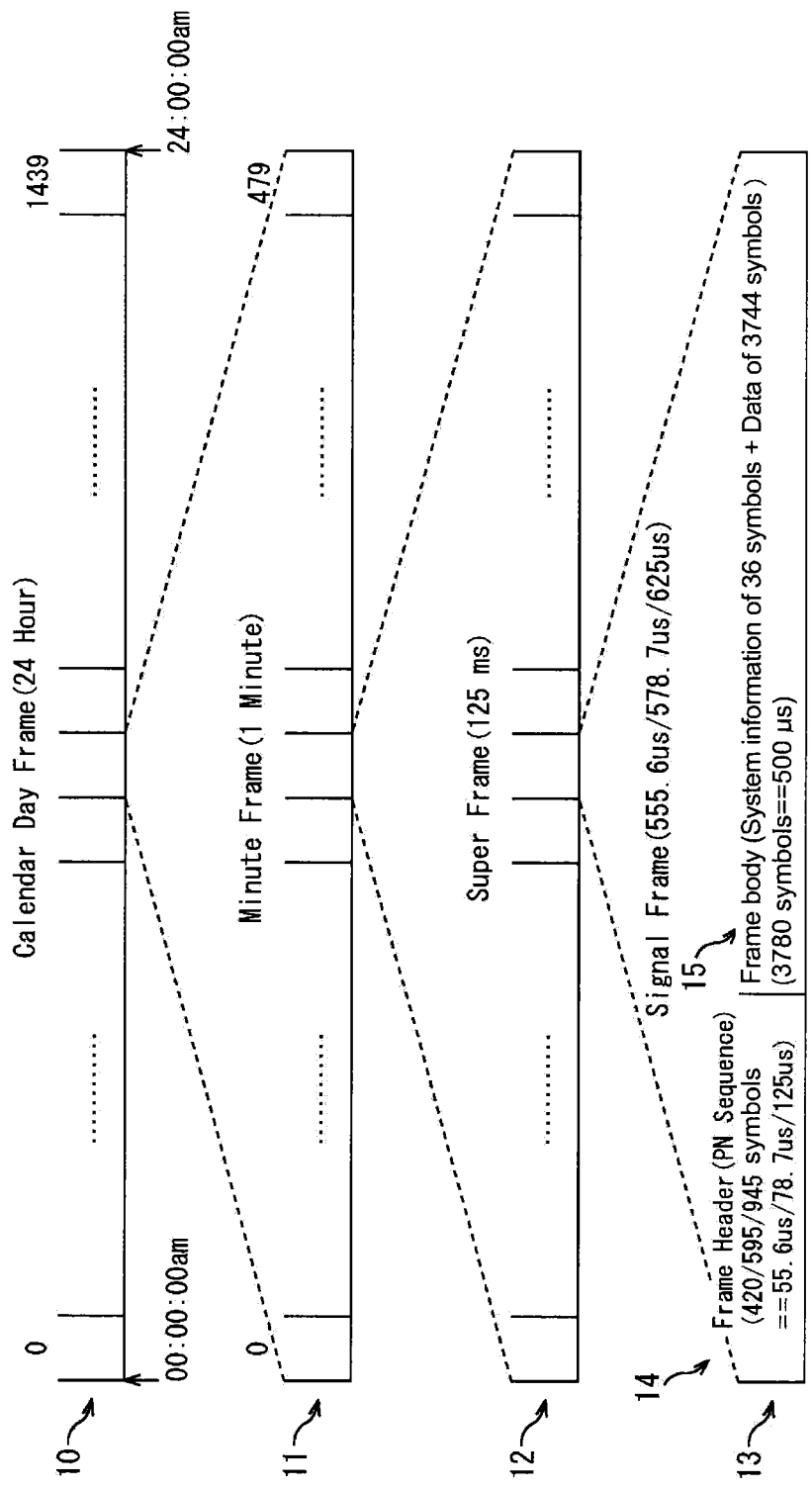
FIG. 1 is a diagram for illustrating a frame structure defined by the DTMB standard.
Figure 2:
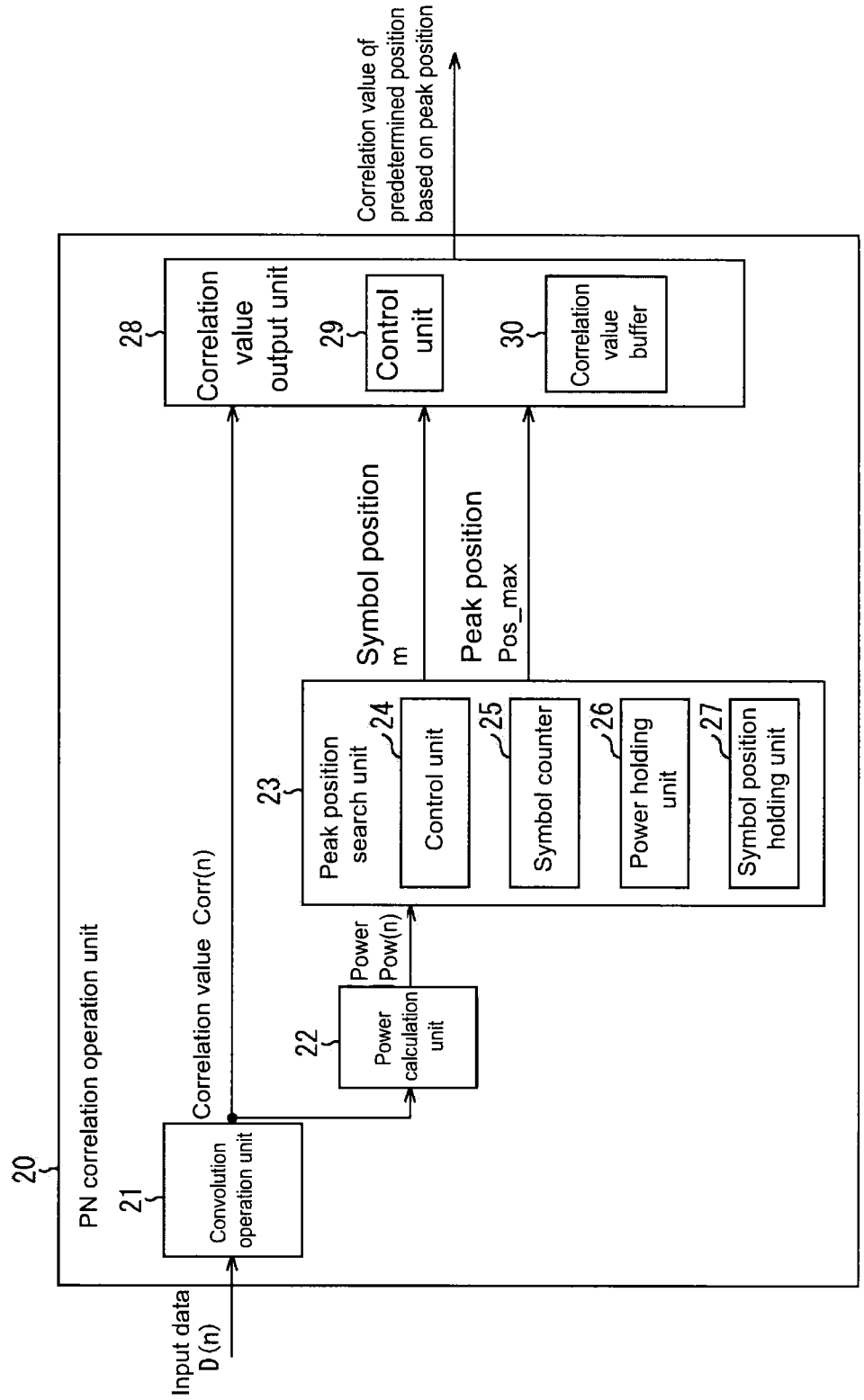
FIG. 2 is a block diagram of a PN correlation operation unit.
Figure 3:
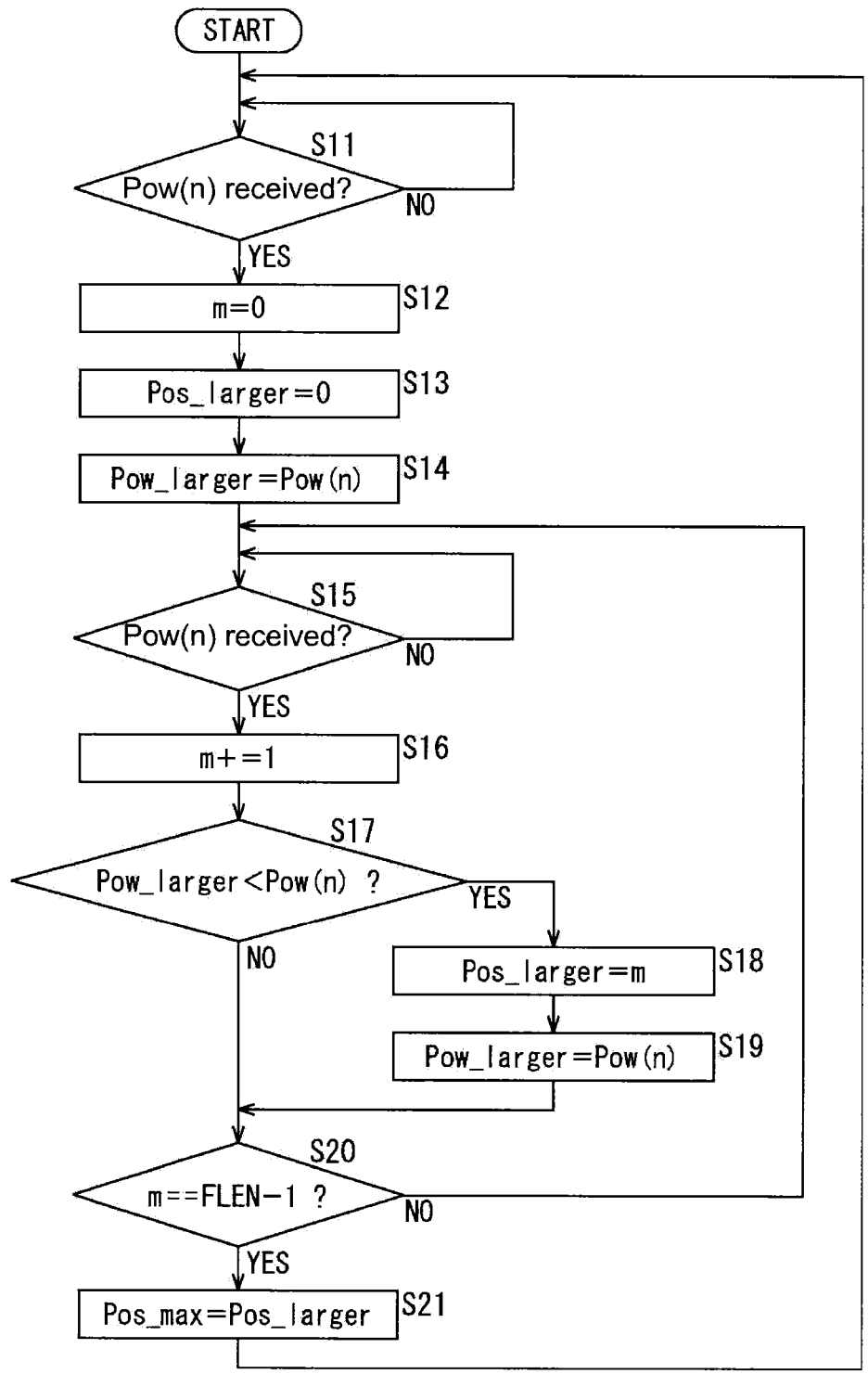
FIG. 3 is a flowchart explaining how a peak position search unit operates.
Figure 4:
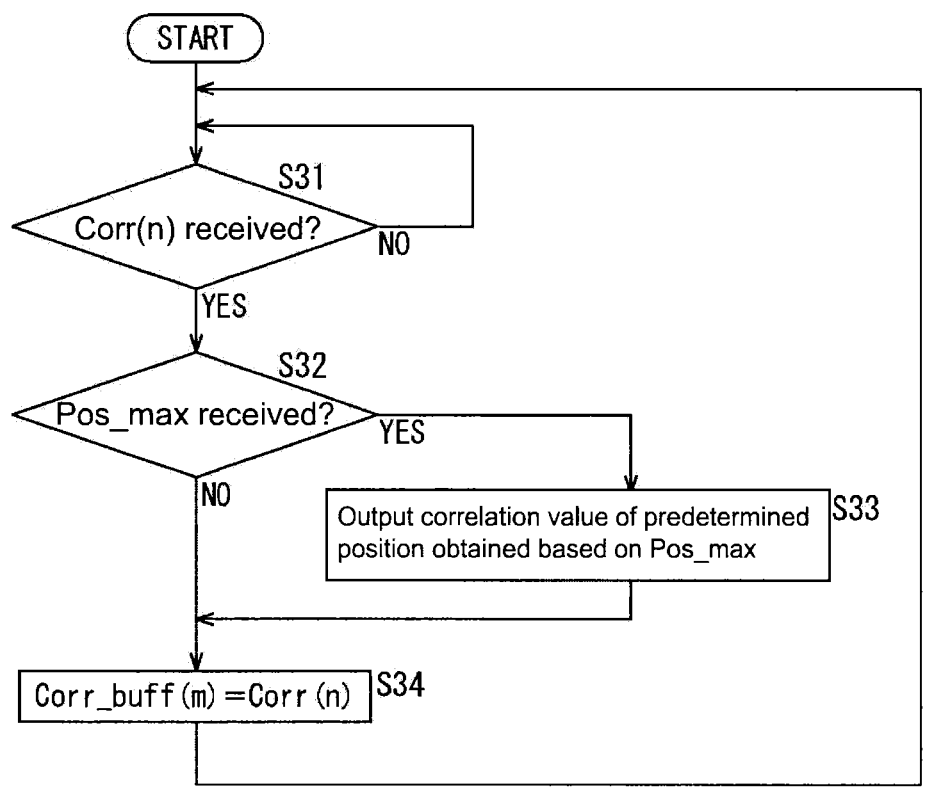
FIG. 4 is a flowchart explaining an operation to output a correlation value of a peak position.
Figure 5:
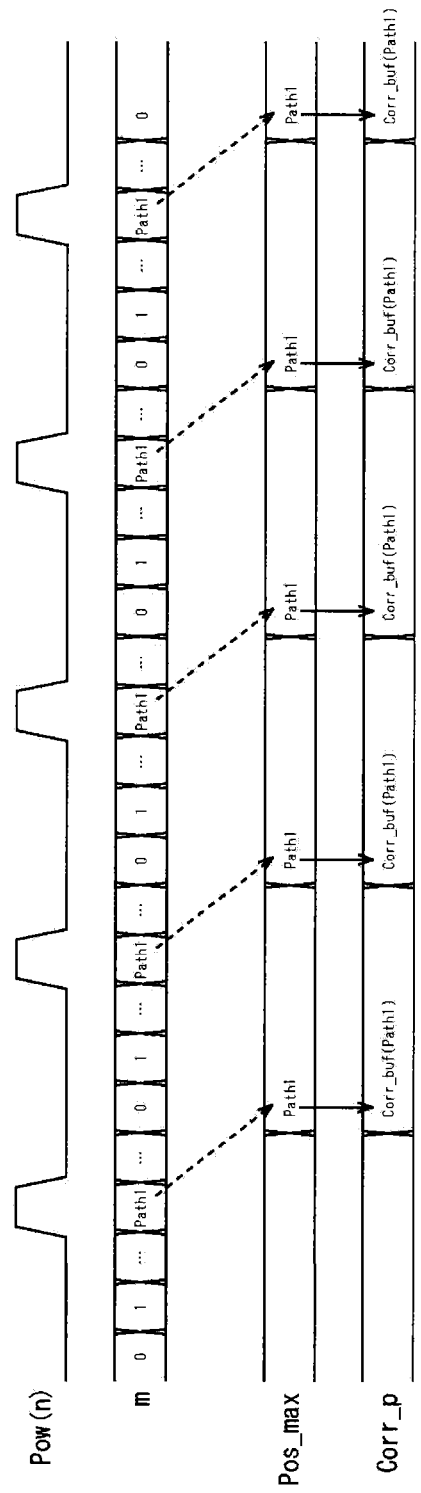
FIG. 5 is a timing chart explaining operations of a receiving apparatus in an environment in which no multipath exists.

In FIG. 6, components which are the same as those illustrated in FIG. 2 are denoted by the same reference numerals as those used in FIG. 2, and a duplicate description may be omitted.

The configuration of a PN correlation operation unit 40 illustrated in FIG. 6 is different from the configuration of the PN correlation operation unit 20 in FIG. 2 in that a peak position deviation detection unit 41 is newly provided, and a correlation value output unit 45 is provided in place of the correlation value output unit 28.

The PN correlation operation unit 40 in FIG. 6 observes peak position deviations, applies a protection stage to a low-frequency deviation, and outputs a correlation value of a predetermined position based on a peak position before occurrence of the deviation.

The peak position deviation detection unit 41 applies a protection stage to a peak position Pos_max which is an input signal from a peak position search unit 23, outputs a peak position Pos_lock, and also outputs a peak position deviation detection flag Pos_diff which indicates that a peak position deviates. The peak position Pos_lock and the peak position deviation detection flag Pos_diff are both supplied to the correlation value output unit 45.

Specifically, the peak position deviation detection unit 41 is made up of a control unit 42, a peak deviation counter 43, and a peak position holding unit 44.

The control unit 42 determines whether or not there is a peak position deviation by comparing the Pos_max from the peak position search unit 23 with the peak position Pos_lock that is held by the peak position holding unit 44.

If it is determined that there is no peak position deviation, the control unit 42 causes the peak deviation counter 43 (count value of the peak deviation counter 43) to be set to 0 (zero), and causes the peak position holding unit 44 to replace the Pos_lock that is held thereby with the Pos_max, and outputs Pos_diff=0.

On the other hand, if it is determined that there is a peak position deviation, the control unit 42 causes the peak deviation counter 43 to increment by 1, and outputs Pos_diff=1. However, if a count value held by the peak deviation counter is equal to or greater than a set value, the control unit 42 causes the peak position holding unit 44 to replace the Pos_lock that is held thereby with the Pos_max, causes the peak deviation counter 43 to be set to 0, and outputs Pos_diff=0.

The peak deviation counter 43 initializes its count value to 0 or increments it by 1 according to an instruction from the control unit 42.

The peak position holding unit 44 holding a peak position Pos_lock replaces the Pos_lock with the Pos_max according to an instruction from the control unit 42.

Figure 7:
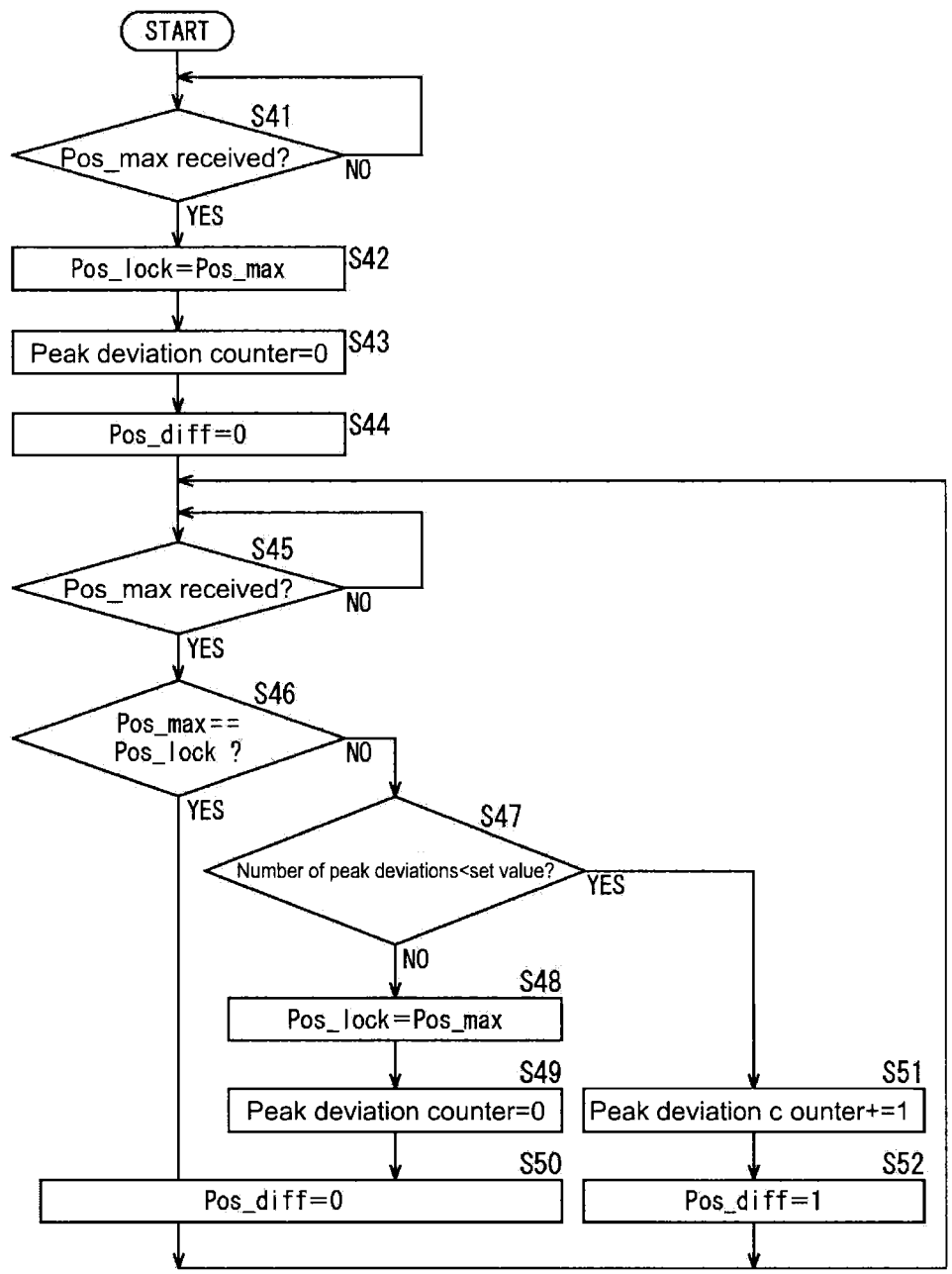
FIG. 7 is a flowchart explaining an operation to detect a deviation of a peak position.

FIG. 7 is a flowchart for explaining how the peak position deviation detection unit 41 operates.

In step S41, the control unit 42 determines whether or not a new Pos_max is input from the peak position search unit 23.

If it is determined in step S41 that a new Pos_max is not input, the control unit 42 waits until it is determined that a new Pos_max is input.

On the other hand, if it is determined in step S41 that a new Pos_max is input, the control unit 42 instructs the peak position holding unit 44 to perform initialization to a state Pos_lock=Pox_max in step S42

The control unit 42 causes the peak deviation counter 43 to perform initialization to 0 in step S43, and outputs Pos_diff=0 in step S44.

In step S45, the control unit 42 determines whether or not a new Pos_max is input.

If it is determined in step S45 that a new Pos_max is not input, the control unit 42 waits until it is determined that a new Pos_max is input.

On the other hand, if it is determined in step S45 that a new Pos_max is input, the control unit 42 determines whether or not the newly-input Pos_max is equal to the Pos_lock held by the peak position holding unit 44 in step S46.

If it is determined in step S46 that the Pos_max is equal to the Pos_lock, the control unit 42 branches the process to step S50.

On the other hand, if it is determined in step S46 that the Pox_max is not equal to the Pos_lock, the control unit 42 determines whether or not a value held by the peak deviation counter 43 is less than a set value in step S47.

If it is determined in step S47 that the value held by the peak deviation counter 43 is less than the set value, the control unit 42 increments the peak deviation counter 43 by 1 in step S51.

In step S52, the control unit 42 outputs Pos_diff=1, and returns the process to step S45.

On the other hand, if it is determined in step S47 that the value held by the peak deviation counter 43 is not less than the set value, the control unit 42 instructs the peak position holding unit 44 to replace Pos_lock with Pos_max in step S48.

In step S49, the control unit 42 instructs the peak deviation counter 43 to perform initialization to 0.

In step S50, the control unit 42 output Pos_diff=0, and returns the process to step S45.

Through the processing steps above, it is allowed to output an output peak position Pos_lock that is obtained by applying a protection stage to the input Pos_max, and to output a peak position deviation detection flag Pos_diff that is a flag indicating that there is a peak position deviation.

The configuration of the correlation value output unit 45 in FIG. 6 is different from the configuration of the correlation value output unit 28 in FIG. 2 in that a control unit 46 is provided in place of the control unit 29.

The correlation value output unit 45 outputs Corr_p which is a correlation value shifted by d symbols from the predetermined position based on a peak position that a subsequent synchronization circuit requests, based on a correlation value Corr(n) which is an input signal from a convolution operation unit 21, a symbol position m and a peak position Pos_max both of which are input signals from a peak position search unit 23, and a locked peak position Pos_lock and a peak position deviation detection flag Pos_diff which are input signals from the peak position deviation detection unit 41.

When receiving Corr(n), the control unit 46 writes Corr_buf(m)=Corr(n) to a correlation value buffer 30 using the symbol position m as an address.

When receiving Pos_max, if Pos_diff=0, the control unit 46 reads a correlation value of a predetermined position d based on Pos_max from the correlation value buffer 30 and outputs this correlation value to a subsequent circuit. On the other hand, if Pos_diff=1, the control unit 46 reads a correlation value of a predetermined position d based on Pos_lock, and output this correlation value to a subsequent circuit.

In other words, the control unit 46 outputs values as follows:

when Pos_diff=0, it outputs Corr_$p$=Corr_buf((Pos_max+$d$)% FLEN), and when Pos_diff=1, it outputs Corr_$p$=Corr_buf((Pos_lock+$d$)% FLEN).

Figure 8:
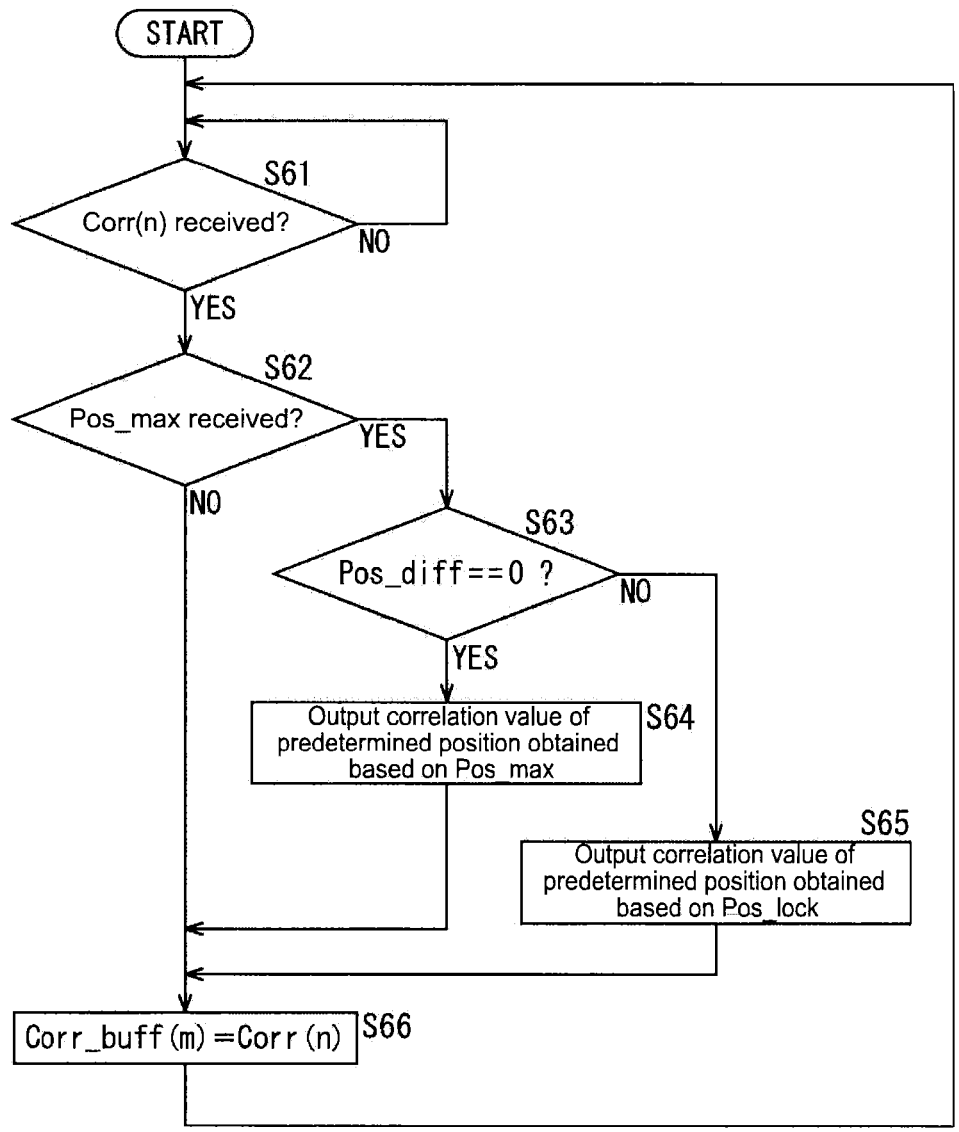
FIG. 8 is a flowchart explaining an operation to output a correlation value when a deviation of a peak position is detected.

FIG. 8 is a flowchart explaining how the correlation value output unit 45 operates.

In step S61, the control unit 46 determines whether nor not a new Corr(n) is input.

If it is determined in step S61 that a new Corr(n) is not input, the control unit 46 waits until it is determined that a new Corr(n) is input.

On the other hand, if it is determined in step S61 that a new Corr(n) is input, the control unit 46 determines whether or not a new Pos_max is input in step S62.

If it is determined in step S62 that a new Pos_max is not input, the control unit 46 branches the process to step S66.

On the other hand, if it is determined in step S62 that a new Pos_max is input, the control unit 46 determines whether or not a new Pos_diff is equal to 0 in step S63.

If it is determined in step S63 that the Pos_diff is equal to 0, the control unit 46 reads a correlation value of a predetermined position d based on the Pos_max from a correlation value buffer 30, and outputs the correlation value to a subsequent circuit in step S64. Subsequently, the control unit 46 branches the process to step S66.

On the other hand, if it is determined that the Pos_diff is not equal to 0 in step S63, the control unit 46 reads a correlation value of a predetermined position d based on the Pos_lock from the correlation value buffer 30, and outputs the correlation value to a subsequent circuit in step S65. Subsequently, the control unit 46 branches the process to step S66.

In step S66, the control unit 46 writes Corr_buf(m)=Corr (n) to the address m of the correlation value buffer 30. After step S66, the process returns to step S61, and the processing steps above are repeated.

Through the processing steps above, it is allowed to output a collation value corresponding to a peak position Pos_max requested by a subsequent synchronization circuit, or to output a collation value corresponding to a peak position Pos_lock if a peak position deviates.

Figure 9:
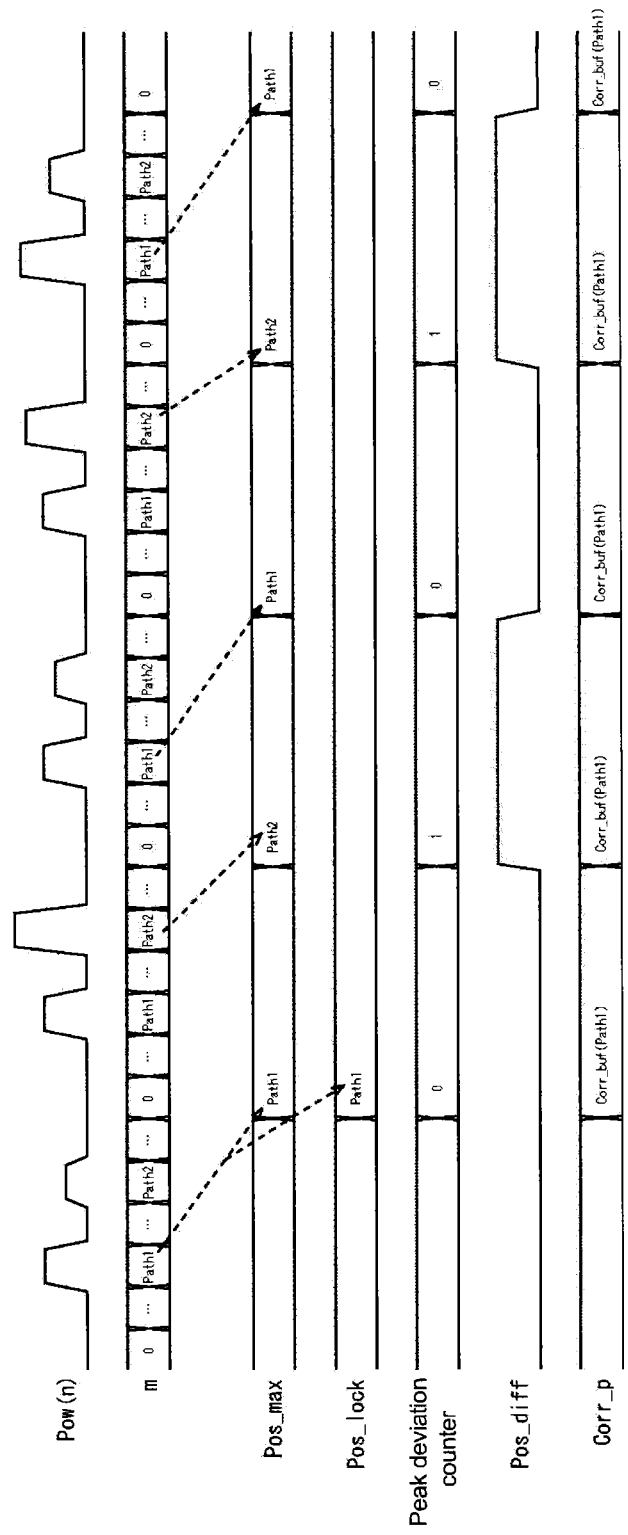
FIG. 9 is a timing chart explaining operations of a receiving apparatus in an environment in which a multipath exists.

FIG. 9 is a timing chart explaining how the PN correlation operation unit 20 operates when a multipath exists. The timing chart in FIG. 9 illustrates an example in a dual wave environment.

By way of example, a case in which a subsequent circuit uses a correlation value which satisfies d=0, i.e., a correlation value of a peak position is shown. A symbol position at which one path exists is Path1, and a symbol at which the other path exists is Path2. A set value of the peak position deviation detection unit 41 is 7.

Due to power fluctuations from the paths, a peak position changes in order of Path1, Path2, Path1, Path2, Path1 from the first frame.

In this example, on the first frame, Path1 is held as Pos_lock, and the peak deviation counter 43 is initialized to 0. Furthermore, the correlation value of a peak position, Corr_p=Corr_buf(Path1), is output.

On the second frame, the peak position is changed to Path2, and the relationship Pos_max=Pos_lock does not hold. At this time, the number of peak deviations is 0, which is less than 7. Thus, the relationship Pos_diff=1 holds, and the peak deviation counter 43 is incremented to 1. Since Pos_diff=1, Corr_buf(Path1), which is a correlation value of a position Pos_lock, is output in place of Corr_buf(Path2), as Corr_P.

On the third frame, the peak position is changed to Path1, and the relationship Pos_max=Pos_lock holds, so that the peak deviation counter 43 is initialized to 0. Furthermore, the relationship Pos_diff=0 holds, and Corr_buf(Path1) is output as Corr_P.

On the fourth frame, the peak position is changed to Path2, and the relationship Pos_max=Pos_lock does not hold. At this time, the number of peak deviations is 0, which is less than 7. Thus, the relationship Pos_diff=1 holds, and the peak deviation counter 43 is incremented to 1. Since the relationship Pos_diff=1 holds, Corr_buf(Path1), which is a correlation value of a position Pos_lock, is output in place of Corr_buf(Path2) as Corr_p.

On the fifth frame, the peak position is changed to Path1, and the relationship Pos_max=Pos_lock holds, so that the peak deviation counter 43 is initialized to zero. Furthermore, the relationship Pos_diff=0 holds, and Corr_buf(Path1) is output as Corr_P.

As described above, if there is a peak position deviation, correlation values at the same path position are output, so that stable synchronization control is provided in a subsequent synchronization circuit.

Figure 10:
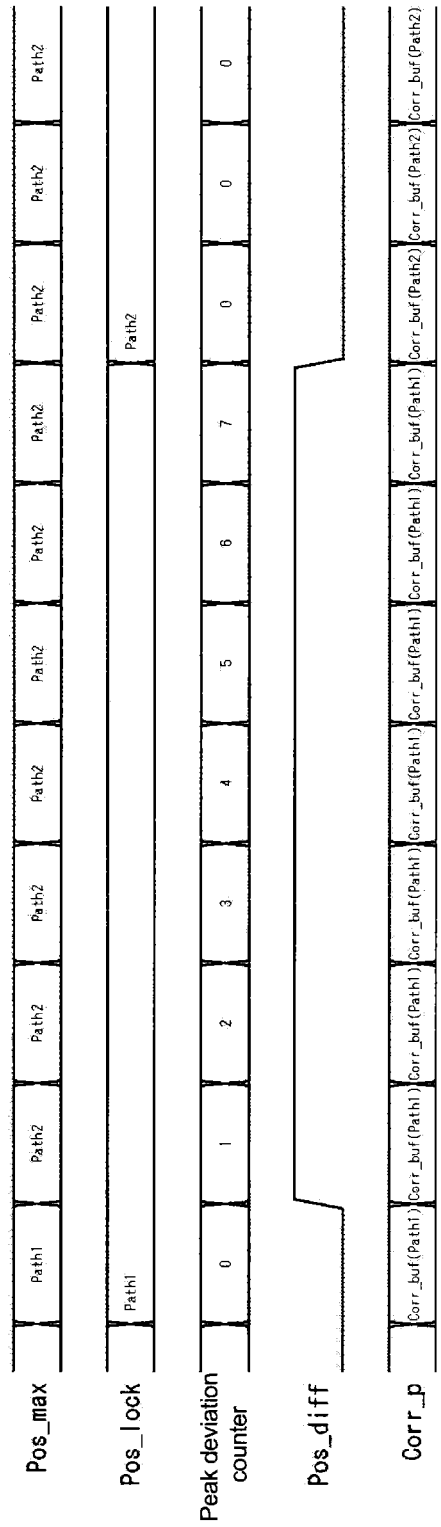
FIG. 10 is a timing chart explaining operations of a receiving apparatus in an environment in which a multipath exists.

FIG. 10 is a timing chart explaining how a peak position Pos_lock of the PN correlation operation unit 40 changes when a multipath exists. The timing chart in FIG. 10 illustrates an example in a dual wave environment.

By way of example, a case in which a subsequent circuit uses a correlation value of a peak position, i.e., a correlation value which satisfies d=0, is shown. A symbol position at which one path exists is Path1, and a symbol at which the other path exists is Path2.

Assume that the power of a path at Path1 is greater in the first frame, while the power of a path at Path2 is greater in the second or subsequent frame, and a set value of the peak position deviation detection unit 41 is 7.

On the first frame, Path1 is held as Pos_lock, and Corr_p=Corr_buf(Path1) is output.

On the second frame, the peak position is changed to Path2, and the relationship Pos_max=Pos_lock dose not hold. At this time, the number of peak deviations is 0, which is less than 7. Thus, the relationship Pos_diff=1 holds, and the peak deviation counter 43 is incremented to 1. Since Pos_diff=1, Corr_buf(Path1), which is a correlation value of a position Pos_lock, is output in place of Corr_buf(Path2) as Corr_p.

On each of the third to eighth frames, as well as the second frame, the relationship Pos_max=Pos_lock does not hold, and the number of peak deviations is less than the set value 7. Thus, the relationship Pos_diff=1 holds, so that the peak deviation counter 43 is incremented by one. As Corr_p, corre_buf(path1) is output in place of Corr_buf(Path2).

On ninth frame, the number of peak position deviations is 7, which is not less than the set value 7, so that Pos_diff=0 is output, and replacement with Pos_lock=Path2 is performed.

In addition, the peak deviation counter 43 is initialized to 0, and Corr_buf(Path2), the correlation value of Path2 that is Pos_max, is output as Corr_p.

On tenth or subsequent frame, the relationships Pos_max=Pos_lock and Pos_diff=0 hold, so that Corr_buf(Path2), the correlation value of Path2 that is Pos_max, is output as Corr_p.

As described above, when a path, at which power is at a maximum, changes regularly, processing is performed so that a correlation value of the path is output. Thus, it becomes possible for a subsequent synchronization circuit to implement synchronization with a path at which power is at a maximum.

Second Embodiment

Figure 11:
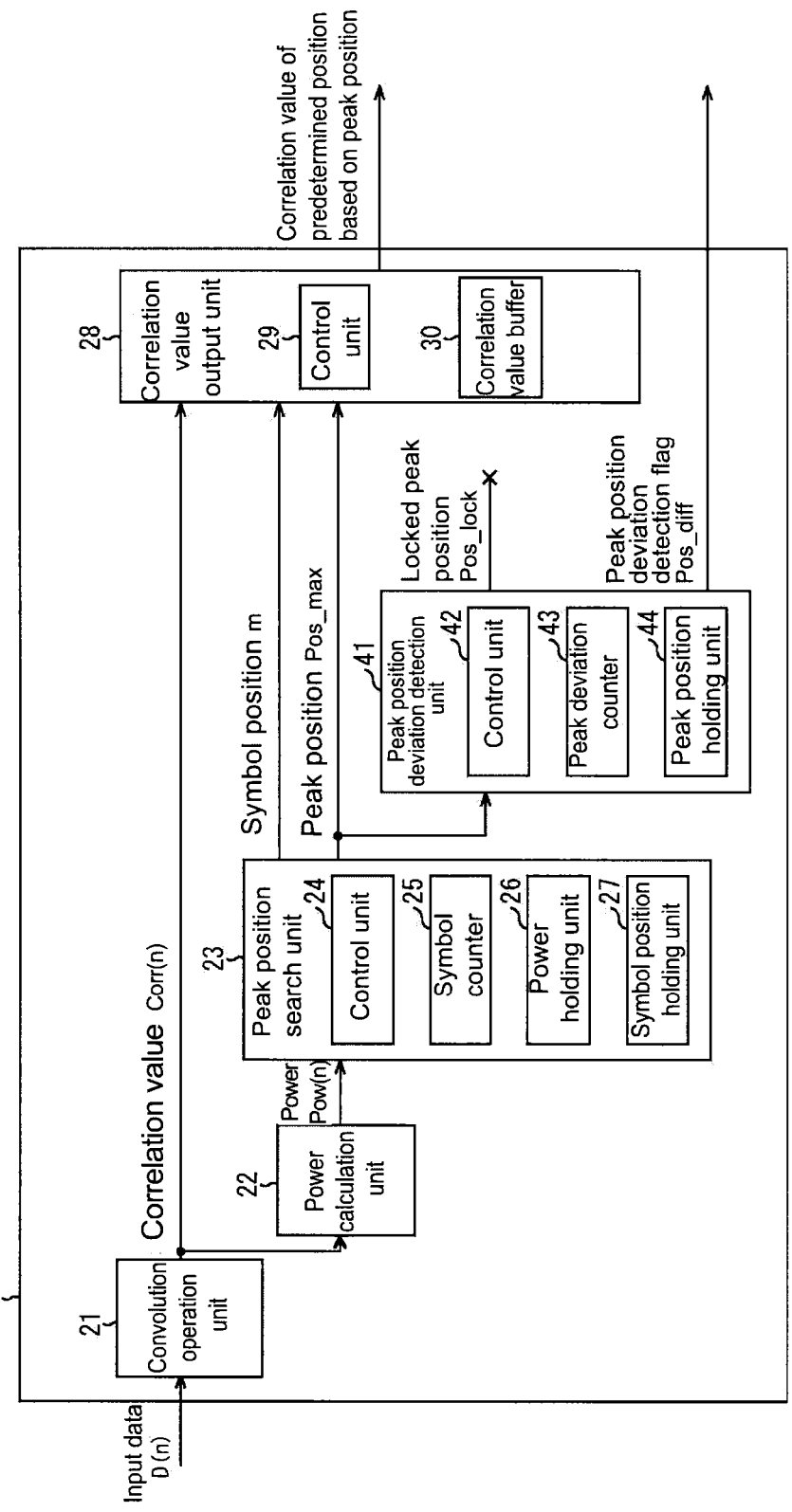
FIG. 11 is a block diagram illustrating an exemplary configuration of a second embodiment of a receiving apparatus to which the present technology is applied.

FIG. 11 is a block diagram illustrating an exemplary configuration of a second embodiment of a receiving apparatus to which the present technology is applied.

In FIG. 11, components which are the same as those illustrated in FIG. 2 or FIG. 6 are denoted by the same reference numerals as those used therein, and a duplicate description may be omitted.

The configuration in FIG. 11 is different from the configuration in FIG. 2 in that a peak position deviation detection unit 41 is newly provided, and a peak position deviation detection flag Pos_diff, which is an output signal of the peak position deviation detection unit 41, is an output signal to a subsequent circuit.

A PN correlation operation unit 50 in FIG. 11 observes a peak position deviation, and outputs Pos_diff to the subsequent synchronization circuit. If Pos_diff is 0, the subsequent synchronization circuit performs normal operations. On the other hand, if Pos_diff is 1, the subsequent synchronization circuit performs processing to replace an error result determined by using a PN correlation value with 0, to apply a limiter to the error result, to reduce a loop gain, etc.

In the PN correlation operation unit 50 in FIG. 11, Pos_lock that is output from the peak position deviation detection unit 41 is not used.

Figure 12:
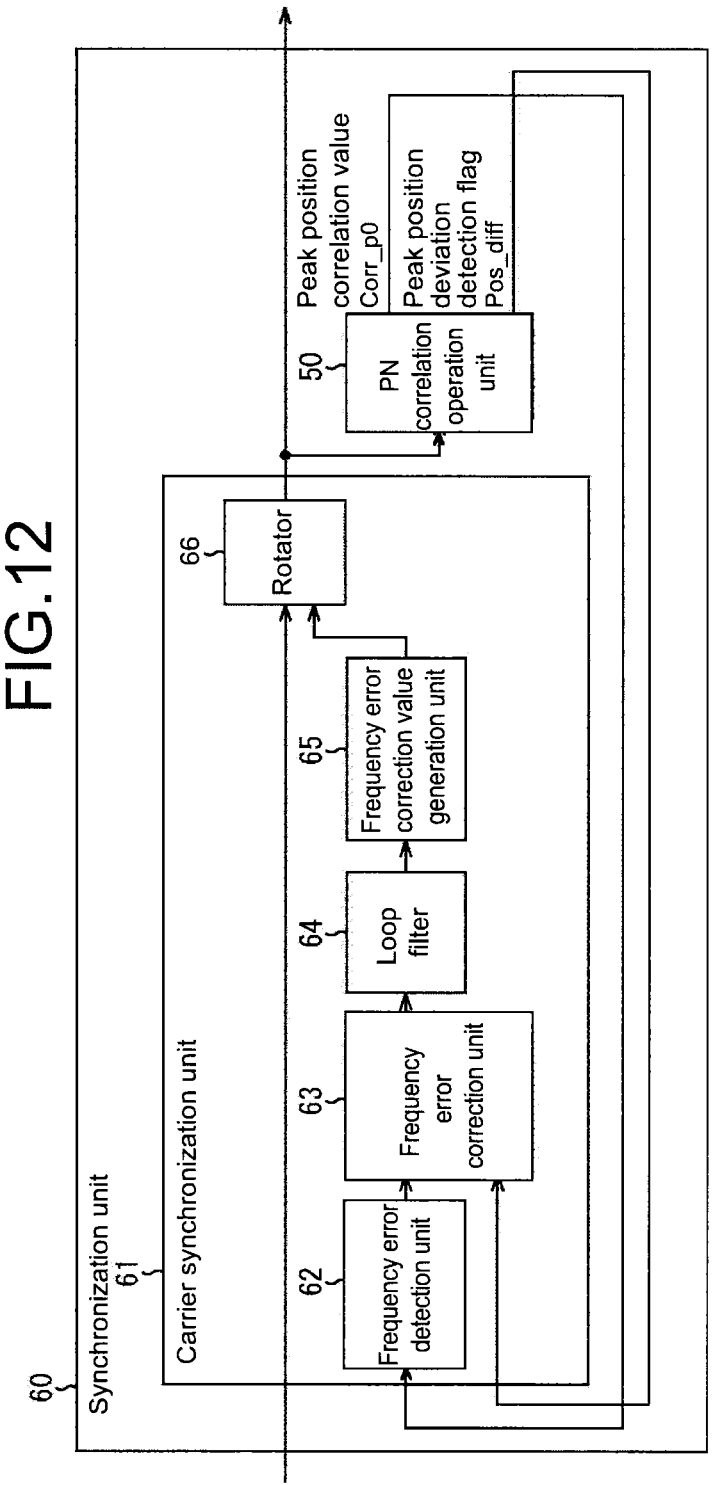
FIG. 12 is a block diagram illustrating an exemplary configuration of a synchronization unit to which the present technology is applied.

FIG. 12 is a diagram illustrating an example in which the PN correlation operation unit 50 in FIG. 11 is applied to a synchronization unit 60 that is a synchronization circuit such as for a carrier synchronization using PN correlation.

Data that is input to the synchronization unit 60 is subjected to a rotation operation by a rotator 66 using a frequency error correction value from a frequency error correction value generation unit 65. An output signal from the rotator 66 is input to the PN correlation operation unit 50.

A peak position correlation value Corr_p0 and a peak position deviation detection flag Pos_diff are output from the PN correlation operation unit 50 and input to a carrier synchronization unit 61.

A frequency error detection unit 62 in the carrier synchronization unit 61 calculates a frequency error ferr(n) using Corr_P0 which is a correlation value of a peak position. As a method of calculating a frequency error ferr(n), for example, a calculation method using Equation (4) given below is known.

$$\text{ferr}(n) = \arg(\text{Corr\_}p0(n) \times \text{conj}(\text{Corr\_}p0(n-1))) \qquad (4)$$

When if the relationship Pos_diff=0 holds, a frequency error correction unit 63 outputs a frequency error ferr(n), which is an output signal from the frequency error detection unit 62, to a loop filter 64 as it is. On the other hand, if the relationship Pos_diff=1 holds, the frequency error correction unit 63 performs correction on the frequency error ferr(n) and output it to the loop filter 64.

Correction of a frequency error ferr(n) is performed, for example, by replacement with ferr(n)=0, by replacement with a ferr(n) when previously Pos_diff=0 holds, by applying a limiter to the ferr(n), and by multiplying the ferr(n) by a correlation factor, etc.

The frequency error ferr(n) output from the frequency error detection unit 63 is filtered by the loop filter 64, and then supplied to the frequency error correction value generation unit 65.

The frequency error correction value generation unit 65 generates a frequency error correction value based on the frequency error ferr(n), and supplies it to the rotator 66.

This enables stable operation to be realized without a fault condition of the carrier synchronization unit 61 even when power of another path peaks in a multipath environment.

Figure 13:
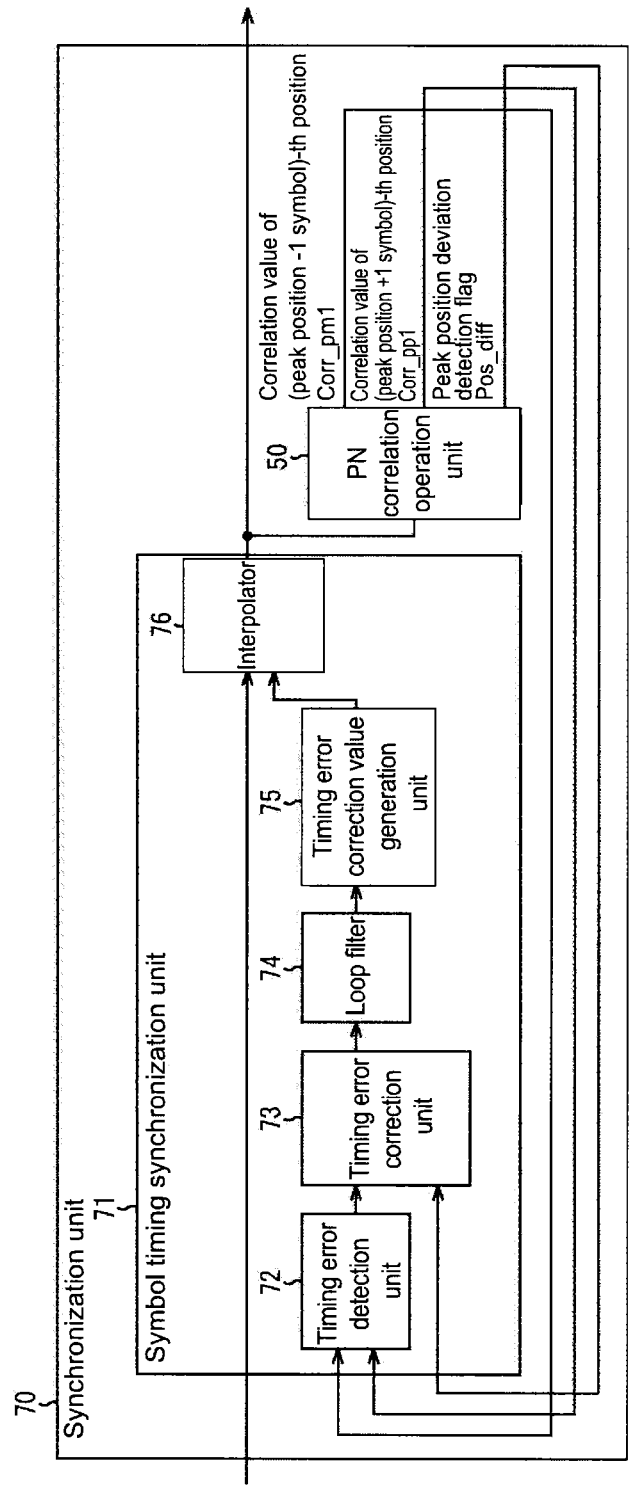
FIG. 13 is a block diagram illustrating another exemplary configuration of a synchronization unit to which the present technology is applied.

FIG. 13 is a diagram illustrating an example in which the PN correlation operation unit 50 in FIG. 11 is applied to a synchronization unit 70 that is a synchronization circuit such as for symbol timing synchronization using PN correlation.

Data input to the synchronization unit 70 is subjected to time interpolation by an interpolator 76 using a timing error correction value from a timing error correction value generation unit 75. An output signal from the interpolator 76 is input to the PN correlation operation unit 50.

Corr_pm1 which is a correlation value of a (peak position −1 symbol)-th position, Corr_pp1 which is a correlation value of a (peak position +1 symbol)-th position, and a peak position deviation detection flag Pos_diff are output from the PN correlation operation unit 50, and are input to a symbol timing synchronization unit 71.

A timing error detection unit 72 of the symbol timing synchronization unit 71 uses Corr_pm1 and Corr_pp1 to calculate a timing error terr(n). As a method of calculating a timing error terr(n), for example, a calculation method using Equation (5) given below is known.

$$\text{terr}(n) = |\text{Corr\_pp1}(n)| - |\text{Corr\_pm1}(n)| \quad (5)$$

When the relationship Pos_diff=0 holds, a timing error correction unit 73 outputs a timing error terr(n), which is an output signal from the timing error detection unit 72, to a loop filter 74 as it is. On the other hand, if the relationship Pos_diff=1 holds, the timing error correction unit 73 performs correction on the timing error terr(n) and outputs it.

Correction of timing error terr(n) is performed, for example, by replacement with terr(n)=0, by replacement with a terr(n) when previously Pos_diff=0 holds, by applying a limiter to the terr(n), by multiplying the terr(n) by a correlation factor, etc.

The timing error terr(n) output from the timing error correction unit 73 is filtered by the loop filter 74, and then supplied to the timing error correction value generation unit 75.

The timing error correction value generation unit 75 converts the timing error terr(n) to a timing error correction value, and output it to the interpolator 76.

This enables stable operation to be realized without a fault condition of the symbol timing synchronization unit 71 even when power of another path peaks in a multipath environment.

Combination Examples of Components

The present technology may take configurations as recited below.

(1) A receiving apparatus including:
a correlation operation unit configured to perform a correlation operation with a known signal on a received signal including the known signal in a predetermined interval; and
a determination unit configured to determine whether or not a correlation peak interval detected by the correlation operation unit deviates from the predetermined interval.

(2) The receiving apparatus according to (1) above, in which the received signal is a signal defined by the GB20600-2006 standard, and the known signal is a pseudo noise signal defined by the GB20600-2006 standard.

(3) The receiving apparatus according to (1) or (2) above, including
a frequency error detection unit configured to detect a frequency error based on a phase difference between each two successive correlation peaks detected by the correlation operation unit.

(4) The receiving apparatus according to (3) above, including
a frequency error correction unit configured to perform correction on the frequency error when the determination unit determines that a correlation peak interval detected by the correlation operation unit deviates from the predetermined interval.

(5) The receiving apparatus according to any one of (1) to (4) above, including
a timing error detection unit configured to detect a timing error based on a correlation peak position detected by the correlation operation unit.

(6) The receiving apparatus according to (5) above, including
a timing error correction unit configured to perform correction on the timing error when the determination unit determines that a correlation peak interval detected by the correlation operation unit deviates from the predetermined interval.

The present disclosure contains subject matter related to that disclosed in Japanese Priority Patent Application JP 2011-115122 filed in the Japan Patent Office on May 23, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A receiving apparatus comprising:
circuitry configured to
perform a correlation operation with a known signal on a received signal including the known signal in a predetermined interval;
determine that a correlation peak interval deviates from the predetermined interval in response to a determination that a frame position of a detected cross-correlation peak is different from a frame position of a cross-correlation peak detected in a previous signal frame and in response to a determination that a number of previous signal frames of the received signal in which a correlation peak interval was determined to deviate from the predetermined interval is less than a predetermined value; and
output a flag indicating that the correlation peak interval deviates from the predetermined interval when a counter indicating the number of previous signal frames of the received signal in which a correlation peak interval was determined to deviate from the predetermined interval is equal a predetermined value.

2. The receiving apparatus according to claim 1, wherein
the received signal is a signal defined by the GB20600-2006 standard, and
the known signal is a pseudo noise signal defined by the GB20600-2006 standard.

3. The receiving apparatus according to claim 1, wherein the circuitry is configured to detect a frequency error based on a phase difference between each two successive detected correlation peaks.

4. The receiving apparatus according to claim 3, wherein the circuitry is configured to perform correction on the frequency error in response to a determination that a detected correlation peak interval deviates from the predetermined interval.

5. The receiving apparatus according to claim 1, the circuitry is configured to detect a timing error based on a detected correlation peak position.

6. The receiving apparatus according to claim 5, the circuitry is configured to perform correction on the timing error when it is determined that a detected correlation peak interval deviates from the predetermined interval.

7. The receiving apparatus according to claim 1, wherein the circuitry is configured to output a correlation value corresponding to a frame position of a cross-correlation peak detected in a previous signal frame when the flag indicating that a correlation peak interval deviates from the predetermined interval is output.

8. A method performed by a receiving apparatus, the method comprising:
performing a correlation operation with a known signal on a received signal including the known signal in a predetermined interval;
determining that a correlation peak interval deviates from the predetermined interval in response to a determination that a frame position of a detected cross-correlation peak is different from a frame position of a cross-correlation peak detected in a previous signal frame and in response to a determination that a number of previous signal frames of the received signal in which a correlation peak interval was determined to deviate from the predetermined interval is less than a predetermined value; and
outputting a flag indicating that the correlation peak interval deviates from the predetermined interval when a counter indicating the number of previous signal frames of the received signal in which a correlation peak interval was determined to deviate from the predetermined interval is equal a predetermined value.

9. A non-transitory computer-readable medium including computer-readable instructions, which when executed by circuitry, cause the circuitry to:
perform a correlation operation with a known signal on a received signal including the known signal in a predetermined interval;
determine that a correlation peak interval deviates from the predetermined interval in response to a determination that a frame position of a detected cross-correlation peak is different from a frame position of a cross-correlation peak detected in a previous signal frame and in response to a determination that a number of previous signal frames of the received signal in which a correlation peak interval was determined to deviate from the predetermined interval is less than a predetermined value; and
output a flag indicating that the correlation peak interval deviates from the predetermined interval when a counter indicating the number of previous signal frames of the received signal in which a correlation peak interval was determined to deviate from the predetermined interval is equal a predetermined value.

* * * * *